Nov. 14, 1950     E. S. PETERSON     2,530,076
TIME ANNOUNCING SYSTEM

Filed Jan. 28, 1949     4 Sheets-Sheet 2

FIG.2

INVENTOR.
EDWARD S. PETERSON
BY
ATTORNEY

Nov. 14, 1950  E. S. PETERSON  2,530,076
TIME ANNOUNCING SYSTEM
Filed Jan. 28, 1949  4 Sheets-Sheet 3
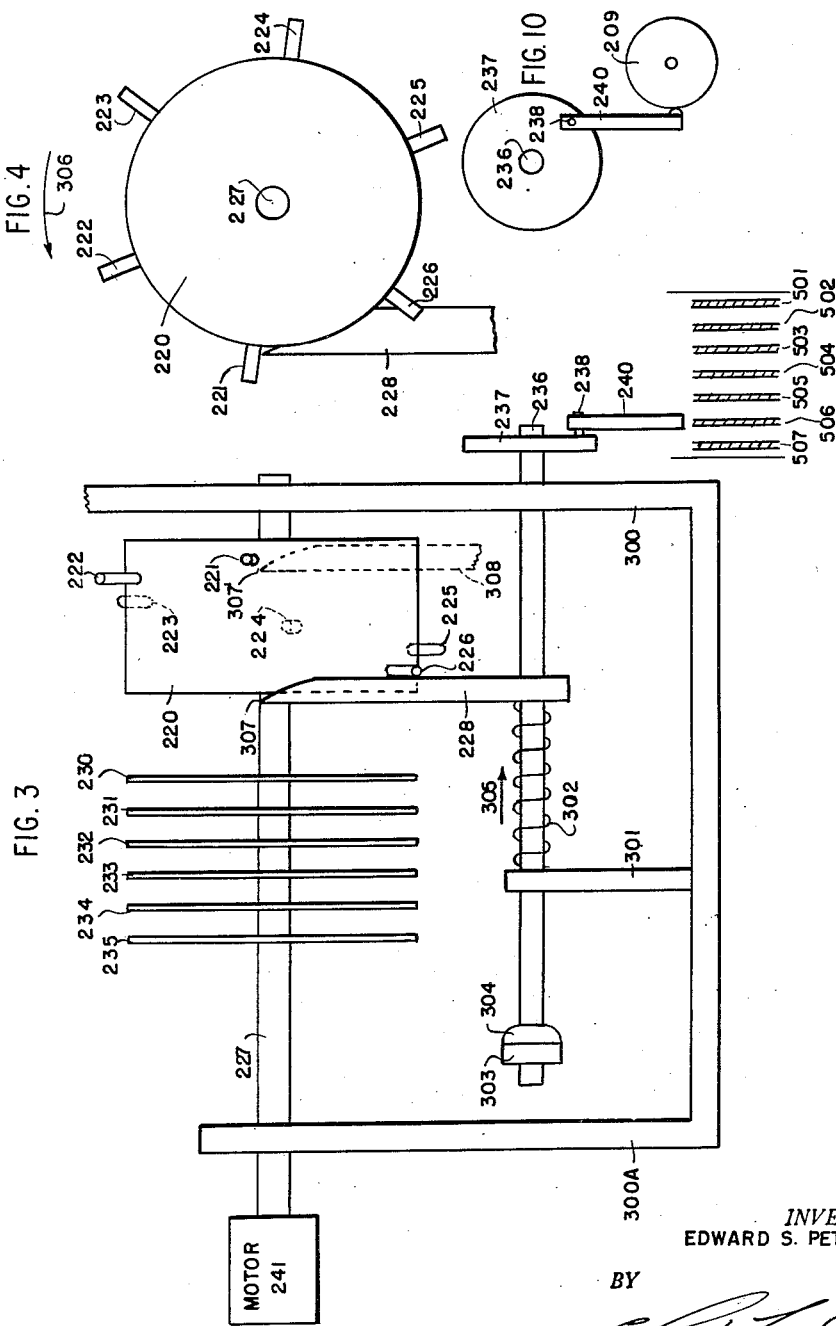
INVENTOR.
EDWARD S. PETERSON
BY
ATTORNEY

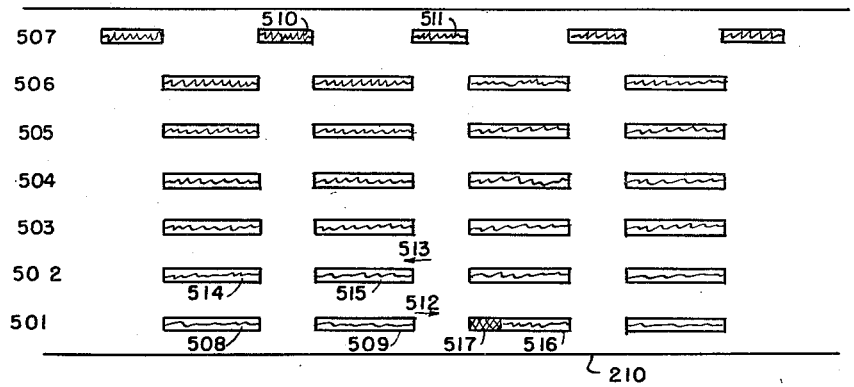
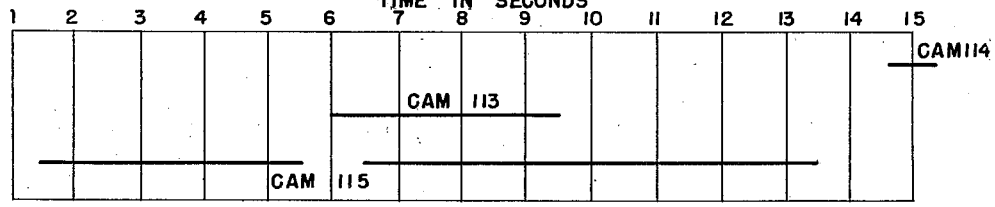
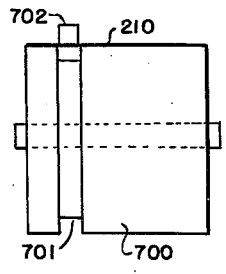
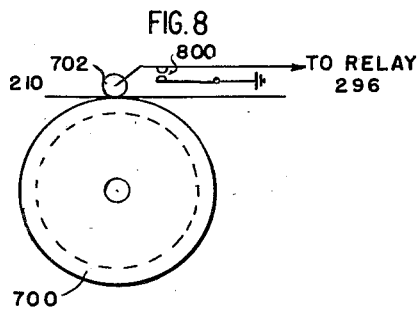
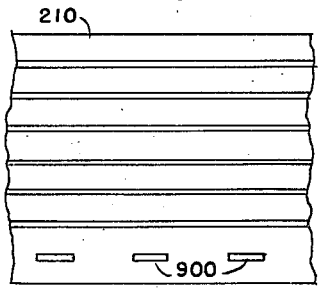

Patented Nov. 14, 1950

2,530,076

UNITED STATES PATENT OFFICE 2,530,076

TIME ANNOUNCING SYSTEM

Edward S. Peterson, Elmwood Park, Ill., assignor to Automatic Electric Laboratories, Inc., Chicago, Ill., a corporation of Delaware Application January 28, 1949, Serial No. 73,303

15 Claims. (Cl. 179—100.3)

This invention relates in general to sound reproducing systems and more particularly to a sound reproducing system that may be utilized for making periodic announcements at predetermined times such as in "time of day" announcement service for telephone subscribers and spot announcements for radio broadcasting stations.

The object of this invention is to provide a sound reproducing system which will accurately and reliably reproduce a large number of separate individual announcements automatically at predetermined times and over a long period of time from a record device having a relatively short running period.

Another object of the invention is to provide a means and method for driving the record device whereby the wear and tear on the record device is reduced to a minimum compared to that of similar systems and by so doing also allow for a greater number of announcements to be recorded on the record device than may be normally recorded on a record device of the same size and length in similar systems.

Another object of the invention is to provide a means and method of synchronizing the time period and the beginning of each announcement so that no accumulation of error may occur over the long period of time needed to make all the announcements, due to any variation that may occur in the driving speed of the system.

One feature of this invention resides in the provision of a record device whereon are recorded a plurality of separate announcements, a driving means for moving the record relative to a reproducer for the purpose of audibly reproducing the announcements, a timer device for automatically starting the driving means at predetermined times, and means operated under control of the record device after an announcement has been made for stopping the driving means.

Another feature resides in the provision of a plurality of record devices such as magnetic wire, each carrying a sound track thereon, or a single record device such as a strip of film with a magnetic coating whereon are recorded a plurality of parallel sound tracks, a common driving means to drive the plurality of record devices in the first instance simultaneously or a driving means for driving the single record device in the second instance, a timer device such as a synchronous motor similar to those used in the common electrical clock, means which will operate under the control of the synchronous motor at predetermined times in the day to start the driving means so that an announcement may be made from one of the sound tracks, and a control means operated under control of a sound recorded on another of the sound tracks for stopping the driving means after the announcement has been made.

Another feature resides in the provision of a film record device whereon the announcement sound tracks are parallel and run longitudinally in alternately opposite directions, a reversible driving means for driving the film in alternately opposite directions past the reproducer means to reproduce the sound on the sound tracks, and a timer device for causing the driving means to be reversed and the reproducer means to be associated with the proper sound track at the proper time thereby allowing a relatively short length of film to be used to make a large number of announcements without interrupting the continuous chain of announcements to change reels or rewind the film.

Another feature resides in the method used to drive the film consisting of a friction roller instead of a sprocket wheel so as to minimize wear and tear on the film and as a result eliminating the sprocket holes on the film thereby allowing room for additional sound tracks on the film.

These and other objects, features, uses and advantages of the invention can be easily perceived by those skilled in the art from the following detailed description.

The drawings and the following description show one means of carrying out this invention but it is to be understood that the same result may be obtained in other ways apparent to those skilled in the art. The machine and method disclosed herein constitute a time announcement system comprising a film with a coating of magnetic substance whereon are magnetically recorded a plurality of parallel sound tracks. One of the sound tracks is used as a control sound track. The remainder of the sound tracks are announcement sound tracks containing a great number of separate time of the day announcements. The announcement sound tracks run in alternately opposite directions and for the entire length of the film. A magnetic reproducer head and amplifying means is used to reproduce the time announcements on the announcement sound tracks, a motor driving means being used to drive the film past the reproducer. A second reproducer means is used to reproduce the sound recorded on the control sound track. A synchronous motor of the type used in an electrical clock is used to control the exact time the announcements are made. At the time of the day corresponding to the first time announcement recorded on the announcement sound track, the timer automatically causes the driving motor to be energized and the film to move past the two reproducing heads. The first time on the sound track is then announced. Immediately after the announcement, a control signal recorded on the control sound track so as to be reproduced after the announcement causes the driving motor to be deenergized and the film to stop. After a short interval of time, the timer at the next time period energizes the motor. The second announcement is made and the control sound track then causes the driving motor to be deenergized. This continues until the last announcement recorded on the one sound track is made at which time the timer causes the announcement reproducer head to move transversely to the film and become associated with a second announcement sound track on which are recorded the subsequent time announcements directly following those recorded on the said one announcement sound track. The timer device also causes the driving motor leads to be reversed so that the film will run in the opposite direction to that followed during the time the announcements on the said one sound track were being made. The separate announcements on the second announcement sound track are made in the same manner as those on the first sound track, the timer device automatically starting the driving motor at the correct time and the control sound track causing the driving motor to stop when the announcement has been made. The same control sound track is used in conjunction with all the announcement sound tracks since each announcement is recorded on a segment of the film equal in length to the segments of the film used to record all the other announcements. This is described in detail at a later point in the specification.

The machine will continue to operate, the driving direction of the film being reversed at the end of each announcement sound track and the announcement reproducer head being associated with the proper announcement sound track at such time, until the last announcement in the last sound track has been made at which time the machine will commence the same cycle and repeat the operations described above until the machine is normally deenergized. The exact method of carrying out the above described operation can be seen from the drawings and description.

Figs. 1 and 2 constitute a wiring diagram showing the interrelationship of the various units employed in carrying out the principle of this invention.

Fig. 3 is a plan view of the apparatus used in associating the reproducing means with the proper sound track on the film.

Figs. 4 and 10 are side views of a part of the apparatus in Fig. 3 taken from the right.

Fig. 5 is a top view of a section of the film used in the embodiment of the invention.

Fig. 6 is a chart showing the exact operation time of certain cam springs of the timer device relative to a fifteen second period.

Figs. 7, 8 and 9 show one method of deenergizing the driving motor after announcements.

Figure 1:
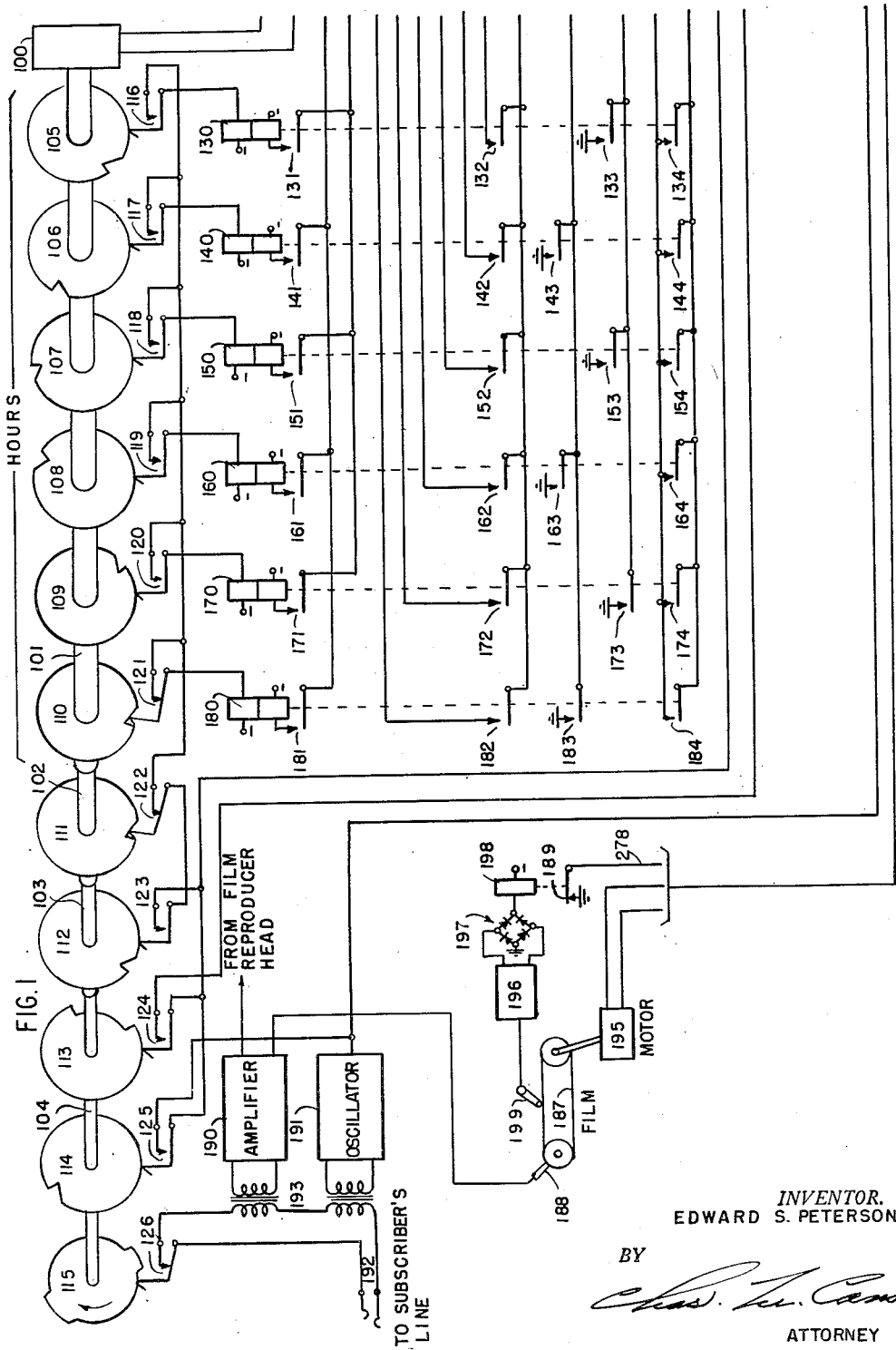

The record device employed in this embodiment of the invention is a film 210 similar in shape and dimensions to that used for motion pictures such as 16 mm., 32 mm. or the like. The film is specially treated by coating it with a substance that may be easily magnetized such as iron oxide. Located on the film 210 are a plurality of parallel spaced sound tracks 501 to 507 inclusive (Fig. 5). Six of these sound tracks 501 to 506 inclusive are announcement sound tracks and the remaining sound track 507 is a control sound track. There could be more or less than six announcement tracks as there is no limit to the width of film that could be employed in this embodiment but for our purposes only six announcement sound tracks are needed.

Magnetically recorded in each announcement sound track are a plurality of separate announcements as indicated by 508 and 509. The announcements recorded in sound track 501 run in the direction indicated by the arrow 512. The announcements recorded in the adjacent sound track 502 run in the opposite direction as indicated by the arrow 513. The announcement sound tracks run in alternately opposite directions as shown by the arrows for the entire length of the film. Magnetically recorded in the control sound track are a plurality of spaced tone signals as shown by 510 and 511. The control signals are recorded on the film so that they immediately follow an announcement. For example control signal 510 immediately follows announcement 508 in announcement sound track 501 and also follows announcement 515 in announcement sound track 502. In the embodimet of the invention herein explained, a reproducing means is used to pick up the announcements such as 508 and 509 and a second reproducing means is used to pick up the tone signals 510 and 511. It is necessary to pick up the control signal immediately after an announcement has been made and for this reason the control signals have been pictured in Fig. 5 as being recorded on the film so that the two reproducers sweeping along the film longitudinally in the same plane perpendicular to the film and in either direction would encounter a control signal immediately after an announcement has been reproduced. This can be seen by imagining that a reproducer were moving along sound track 501 in the direction of the arrow 512 and a second reproducer were moving along sound track 507 in the same direction and in the same transverse plane as the first reproducer. Immediaely after announcement 508 had been reproduced by the first reproducer, the second reproducer would encounter the control signal 510. Also, if the first reproducer were moving along sound track 502 in the direction of the arrow 513 and the second reproducer moving along sound track 507 in the same direction and in the same transverse plane as the first reproducer, immediately after the first reproducer had reproduced the announcement 515 the second reproducer would encounter control signal 510. Motion is only relative and it makes no difference if the reproducers move over the film or the film moves past the reproducers. The method employed in this machine is to move the film past the reproducers. It must be understood that the control signals are recorded on the film so that they will be picked up by the second reproducer immediately after an announcement and if the reproducers are not in the same plane perpendicular to an imaginary longitudinal line on the film as was assumed in drawing and describing Fig. 5, the control signals must be off-set relative to the announcements to compensate for the distance between the reproducers. It should also be understood that the entire portion of sound track allotted for each announcement such as 508 need not be completely utilized as is illustrated by announcement 516 and the preceding cross hatched area representing the segment of the allotted sound track not needed for making the announcement.

The film driving means and take-up reels are shown in Fig. 2. The film 210 is carried by two film reels 200 and 201. The film take-up mechanism used to drive reels 200 and 201 is similar to that employed in other systems involving the feeding of film and, not being material to the invention herein, will not be explained in detail. It will suffice to say that the film will be taken up by one reel and taken off the other depending on which direction the film driving motor 212 is rotating. The film is driven by capstan 209, which in turn is directly driven by motor 212. The capstan is a drum shaped roller the driving surface of which is composed of rubber or leather or other frictional material. The film is passed around capstan 209 and is pressed tightly against the capstan by rollers 206 and 207 which are pivoted at points 213 and tensioned against the capstan by spring 208. The film 210 also passes around idler rollers 202 and 203 and over rollers 204 and 205. Rollers 204 and 205 act as a support for the section of film between the rollers 204 and 205 upon which the magnetic reproducer head 211 rests. The magnetic reproducer head 211 is associated with the control sound track 507 of the film 210. A second magnetic reproducer head 240 presses against the film as it passes over capstan 209, this head being the reproducer associated with the announcement sound tracks 501 to 506 inclusive. The method for aligning the head 240 with any one announcement sound track is subsequently explained. The capstan 209 is driven by reversible motor 212, the direction of driving capstan 209 and thereby film 210 dependent on the way leads 263 to 266 inclusive are connected to the 60 cycle power source 285.

The heart of this machine is the master timer device comprising a synchronous motor 100 similar to those used in electrical clocks and a plurality of cams 105 to 115 inclusive driven by the motor 100 at various rotational speeds in the same manner as the hands of a clock. The synchronous motor 100 is connected directly to the 60 cycle commercial power line 285 so as to be continually running since it functions as a timepiece. The motor 100 drives the four shafts 101 to 104 inclusive, shaft 101 rotating at a speed of one revolution every twelve hours, shaft 102 rotating once every hour, shaft 103 rotating once every minute, and shaft 104 making one revolution every 15 seconds. The "two hour" cams 105 to 110 inclusive are fixedly mounted on shaft 101 and make one revolution every twelve hours; the "hour" cam 111 is mounted on shaft 102 and makes one revolution per hour; the "minute" cam 112 is mounted on shaft 103 and makes one revolution per minute; and the "fifteen second" cams 113 to 115 inclusive are mounted on shaft 104 and make one revolution every fifteen seconds. Associated with each cam 105 to 115 inclusive are cam springs 116 to 126 inclusive, the cam springs being caused to operate and restore under the control of notches in the periphery of the cams. The "two hour" cams are so positioned on the shaft 101 that the notches are equally spaced angularly relative to the center line of the shaft 101. This can be seen from an examination of Fig. 1. Since each "two hour" cam rotates once every twelve hours, each cam spring 116 to 121 inclusive will operate and restore once every twelve hours, cam springs 116 to 121 inclusvie operating successively at two hour periods. The drawing has been arranged to show that cam 110 will operate cam springs 121 at some period shortly before 12 o'clock, cam 109 will operate cam springs 120 at some period shortly before two o'clock, cam 108 will operate cam springs 119 at some period shortly before four o'clock, etc. The "one hour" cam 111 is so positioned that the notch operates the cam springs 122 every hour on the hour or shortly before the hour. The "minute" cam 112 is positioned to operate cam springs 123 once every minute exactly on the minute. The "fifteen second" cam 113 is arranged to operate cam springs 124 on the sixth second of every fifteen second period and the notch in cam 113 is made so that cam springs 124 will be closed for approximately three and one half seconds. "Fifteen second" cam 114 is arranged so that the notch operates cam springs 125 once every fifteen seconds exactly on the fifteenth second. "Fifteen second" cam 115 is arranged to close cam springs 126 during the period from about the first half second to the fifth and one half second and again from about the sixth and one half second to the thirteenth and one half second of every fifteen second period. A fifteen second time table has been drawn, see Fig. 6, to aid in fixing the sequence of operation for some of the cam springs of the timer device. The reason for the fixed sequence of operation will become apparent as the functions of the machine are later discussed.

One of the features of this machine is the use of a plurality of parallel spaced sound tracks or channels on the recording film which run alternately in opposite direction in a longitudinal direction on the film. The film is run in one direction with the reproducer means associated with the proper sound track for two hours and, at the end of every two hours, a selecting means is operated under control of the master clock to move the reproducer in a transverse direction to the film to associate the reproducer means with the correct subsequent announcement channel or sound track. The film will then run in the reverse direction to that for the previous two hours until, at the end of the second two hours, the selecting means is again operated to associate the reproducing means with the correct sound track and the film is caused to move in the reverse direction to that of the second two hour period. The selecting means for moving the producer means is shown in detail in Figs. 3, 4 and 10.

The selecting device consists of a cam 220 with six pins 221 to 226 inclusive projecting from the periphery thereof. The pins are equally spaced around the periphery of the cam 220 and also staggered in a uniform manner transversely across the periphery surface of the cam 220 in such a manner that an imaginary continuous line drawn through the center of each pin around the periphery of the cam would follow a similar course to that taken by the thread on a screw. The cam 220 is fixedly mounted on the cam shaft 227 so as to rotate with the cam shaft 227 which is journalled in supports 300 and 300A. Also fixedly mounted on the cam shaft 227 are six cams 230 to 235 inclusive of equal radius each representing a two hour period in a twelve hour span. A notch is located in each cam and the notches are so placed that they are spaced equally in degrees around the cam shaft 227 relative to the center line of the cam shaft, as can be seen from observing Fig. 2. A cam spring 242 to 247 inclusive is associated with each cam and it can be seen that the springs will be operated successively, one operating every sixth of a revolution of the cam shaft 227 and each operating once during a full revolution of the shaft 227.

Associated with the cam 220 and the pins 221 to 226 inclusive is a cam follower arm 228 which is fixedly mounted on the shaft 236. The shaft 236 is in turn slidably mounted in supports 300 and 301 and a spring 302 is placed between the arm 228 and the support 301 so as to tend to move the arm 228 and the shaft 236 in the direction indicated by arrow 305. An adjustable collar 303 with rubber cushion 304 is attached to the shaft 236 at one end so as to limit the shaft's movement in said direction to any predetermined position. Rotatably mounted on the other end of the shaft 236 is a disk 237 on which reproducer head 240 is rotatably attached so as to pivot at point 238. The eccentric relationship created between shaft 236 and head 240 thus allows the adjusting of the head 240 on the capstan 209 so that the head 240 may be set tangent to the capstan which is the position which will give the best performance. The head 240 is thus adjusted by rotating disk 237 on the shaft 236 until the proper position is reached and then securing the disk to the shaft.

Assume that the arm 228 is in the position indicated by the dotted lines 308 with the stop 303 against the support 301. As the cam 220 is rotated in the direction indicated by the arrow 306 the pin 221 contacts the arm 228 near the tip 307' and, as the pin 221 moves along the curved surface of the arm 228, pushes it in the direction opposite to arrow 305 and against spring 302. The arm 228, shaft 226, and head 240 move as one unit. The arm 228 continues to move until the pin 221 reaches the straight portion of the arm at which time reproducer head 240 is associated with channel 501. If the cam should cease to rotate at this point, the pin 221 would hold the arm in that one position. If the cam 220 continues to rotate, pin 222 will contact arm 228 near the tip 307' and, as the pin 22 moves along the curved portion of the arm 228, will move the arm still further in the direction opposite to arrow 305 until such time as the pin 222 reaches the straight portion of the arm 228. If the cam 220 should at this point cease rotating, the pin would hold the arm 228 in this position. As the cam is thus rotated, each pin 221 to 226 inclusive contacts the arm 228 and each moves it one step. The arm 228 will continue to move in that direction opposite to the direction indicated by arrow 305 until the last pin 226 loses contact with the arm 228 at which time, the arm and the shaft 236 and head 240 as a unit, not being held by any pin, will be quickly moved in the direction indicated by arrow 305 due to the force of spring 302 until the collar 303 and cushion 304 contact support 301 at which time the arm will be in the position indicated by dotted lines 308. It is thus seen that the head 240 is moved transverse to the film 210 in equally spaced steps. When the arm 228 is held by pins 222, 223, 224, 225 or 226, the head 240 will be associated with the channels 502, 503, 504, 505 or 506 respectively on the film 210. The shaft 227 and cam 220 are driven by a synchronous motor 241 which will be operated under control of the master clock as will hereinafter be described.

The electrical energy used in driving the various components of this machine is derived from a commercial 60 cycle power line 285, the D. C. voltage needed to operate the relays being obtained by use of step-down transformer 286 and rectifying means 287 in a well known manner. The synchronous motor 100 used in the timer device is connected directly to the power line 285 so as to be running continuously whether the machine is in use or not since the timer device serves as a clock mechanism and must run in accordance with the time of day.

Assuming that the machine is to start in operation at 12 o'clock, either a. m. or p. m. since the time announcements in the a. m. are similar to those in the p. m., and also assuming that the 12 o'clock time announcements and the subsequent announcements are recorded on the film in such a manner that the proper running direction of the film 210 to cause reproduction of the announcements is from the upper reel 200 to the lower reel 201, the drawing has been arranged to depict the condition of the machine at a period shortly before 12 o'clock. The 12 o'clock "two hour" cam 110 has rotated to the position shown to cause the cam springs 121 to be closed by the notch in the cam 110. The "hour" cam 111 has similarly rotated to the position to cause cam springs 122 to close. The "minute" cam 112 is shown at a period shortly before the exact hour of 12.

To start the machine in operation, a non-locking push button 293 is depressed closing the circuit to the lower winding of relay 290 from the battery 294. Relay 290 operates through its lower winding and closes a holding circuit through its upper winding from ground at contacts 291. The circuit remains in this position until the "minute" cam 112 closes cam springs 123 exactly at 12 o'clock.

The circuit provides a signal alarm to indicate whether there is power available to operate the machine. The direct current potential source 294 is an individual battery and is not supplied by the transformer 286 and rectifier means 287 as is the direct current potential supplied to the various relays of the circuit. As long as relay 290 is not operated, a circuit is closed through springs 292 of relay 290 from the battery 294 to the signal means 295 and a visual signal is evident at some prominent place near the machine. When the non-locking push button 293 is depressed to start the machine, relay 290 is operated by closing the battery 294 across the lower winding of relay 290. The circuit to the signal means 295 is opened at springs 292 and the signal is extinguished. If there is power available to transformer 286, relay 290 will lock up through its upper winding from the circuit closed by contacts 291 and the signal 295 will remain extinguished as long as there is power available. However, if there is no power available relay 290 will not lock up through its upper winding and, when the button 293 has been released and the circuit to the lower winding of relay 290 thereby opened, relay 290 will restore and close the circuit to the signal 295 through springs 292. The signal will then indicate that there has been a power failure.

At exactly 12 o'clock, the "minute" cam 112 closes cam springs 123. The ground from contacts 291 of relay 290 is closed through cam springs 123, 122, and 121 to the upper winding of relay 180. Relay 180 operates, closes a holding circuit through contacts 181 to its lower winding from ground at contacts 256 of relay 255, closes a circuit to relay 270 through contacts 183, prepares a circuit to relay 258 through contacts 184 from ground at contacts 291 of relay 290, and closes relay 250 through contacts 182 to cam springs 242 associated with cam 235 on the reproducer head cam shaft 227. Relay 270 operates and prepares a circuit from ground at contacts 291 of relay 290, cam springs 124 on the "15 second" pulse cam 113 to the lower winding of relay 280.

If the reproducer head 240 is not associated with the sound track on the film 210 carrying the 12 o'clock announcement, the cam springs 242 will be held closed by the cam 235 and the ground 248 is closed through the cam springs 242 and through springs 182 of relay 180 to relay 250. Relay 250 will operate, closing the circuit, through contacts 251, from the 60 cycle power source 285 to the motor 241. The motor 241 is energized and rotates the shaft 227 and cams 230 to 235 inclusive until the notch in cam 235 causes the cam springs 242 to be opened and the ground 248 to be removed from relay 250. Relay 250 releases and opens the circuit, through contacts 251, to the motor 241. The motor is deenergized and the shaft 227 and cams 230 to 235 cease to rotate. As the shaft 227 was rotating, the cam 220 was also rotating therewith and the pins 221 to 226 inclusive on the cam 220 were causing the arm 228 and the reproducer head 240 to be moved in a direction transverse to the film 210. The cam 235 is so positioned on the shaft 227 that when it caused the motor 241 to be deenergized, the reproducer head 240 had been moved to the correct sound track, that containing the twelve o'clock announcement, on the film 210.

Approximately six seconds after cam 112 and cam springs 123 had caused the operation of relay 180, cam springs 124 are closed by fifteen second cam 113 closing ground at contacts 291 of relay 290 through contacts 272 of relay 270 to the lower winding of relay 280. Relay 280 operates, closes a circuit from ground at contacts 297 of relay 296 through contacts 281 to its upper winding to hold relay 280 operated when the cam springs 124 operate to open the circuit to the lower winding, and closes the ground at contacts 291 of relay 290 through contacts 282 and contacts 184 of relay 180 to relay 258. Relay 258 operates and closes the circuit, through contacts 259, from the 60 cycle power source 285 to the film driving motor 212. One side of the 60 cycle source is closed to the motor 212 through leads 265 and 266 and the other side through leads 263 and 264, such a connection causing the motor 212 to be driven in the proper direction to cause the film to be taken off reel 200 and taken up by reel 201, the direction being that for reproducing the announcements on the "12 o'clock" sound track.

As the film 210 is being driven past the announcement reproducer head 240 and the control reproducer head 211, the announcement recorded on the sound track associated with the announcement reproducer head is picked up by the reproducer head 240, amplified through amplifying means 190 and induced over the line 192 to be heard by subscribers waiting for the time announcement. The announcement may be something like "At the next tone signal the time will be twelve o'clock and one quarter minute."

Immediately after the end of the announcement, a signal recorded on the control sound track is picked up by the control reproducer head 211. If the two reproducer heads were in the same plane transverse to the film 210, the control signal would be recorded on the film in the position relative to the announcements as shown in Fig. 5. If the reproducers are not in the same plane transverse to the film, as shown in Fig. 2, the control signal must be off-set relative to the announcement to compensate for the distance between the two heads so that the control signal will be picked up immediately after the announcement has been made.

The control signal picked up by the reproducer head 211 is amplified by amplifying means 288 and then rectified by rectifying means 289, the direct current output operating relay 296 during the short period the signal is being reproduced. Operation of relay 296 opens contacts 297 thus removing ground 298 from the upper winding of relay 280. Relay 280 restores and opens the circuit to relay 258 from ground at contacts 291 of relay 290. Relay 258 restores and at contacts 259 opens the circuit from the 60 cycle power source 285 to the film driving motor 212. The motor 212 is deenergized and stops, causing the film 210 to stop.

Exactly on the fifteenth second after twelve o'clock, the "fifteen second" cam 114, by means of the notch in its periphery, closes cam springs 125 causing ground at contacts 291 of relay 290 to be closed to relay 275 and to the oscillator 191. The ground closed to the oscillator circuit causes it to operate to place a short audible tone on the line 192 as the time tone signal. This tone is placed on the line under control of the timer device and not from the film 210 as is the time announcement and therefore is as accurate relative to time as the timer device.

Approximately six seconds after cam springs 125 have operated to cause the short audible tone to be placed on the line, fifteen seconds after cam springs 124 were first operated, cam 113 again closes cam springs 124 to cause ground at contacts 291 of relay 290 to be closed through contacts 272 of relay 270 to the lower winding of relay 280. Relay 280 operates, closes ground 298 from contacts 297 of relay 296 through contacts 281 to its upper winding to hold relay 280 operated when the circuit to the lower winding is opened by the opening of cam springs 124, and closes ground at contacts 291 of relay 290 through contacts 282 and contacts 184 of relay 180 to relay 258. Relay 258 operates as before, closing the 60 cycle power to the film driving motor 121 through contacts 259 and over leads 263 to 266 inclusive. The motor is energized and drives the capstan or driving roller 209 and film 210 to reproduce the second quarter-of-a-minute time announcement. Immediately after this second announcement has been made, the control pickup 211 encounters a second control signal which is amplified through amplifying means 288 and rectified through rectifying means 289 and which operates relay 296 as before. Relay 296 opens contacts 297 to remove ground 298 from the circuit through the upper winding of relay 280. Relay 280 restores and opens the circuit from ground at contacts 291 of relay 290 to relay 258. Relay 258 restores to open the circuit to the film driving motor 212 as before. The film stops running when the motor 212 is deenergized. The tone is again placed on the line on the thirtieth second of the minute due to the closing of cam springs 125 by cam 114. The cycle is again repeated, cam 113 causing relay 280 to operate which in turn causes relay 258 to operate and the film driving motor 212 to start to cause the next time announcement to be made. After this announcement is made, relay 296 again operates in response to a signal on the control sound track of the film to stop the film driving motor. The timer then operates to place a tone on the line exactly on the fifteen second of that quarter of a minute period. Thus it can be seen that a series of time announcements can be made followed by a tone signal. The method employed here starts the film driving motor 212 about the sixth second of every fifteen second period and the announcement and control signal are so recorded on the film 210 that the film driving motor 212 runs until about the thirteenth or fourteenth second of every fifteen second period and stops. On the fifteenth second the tone signal is produced. This leaves a period of about six seconds before the next announcement so this time is utilized by an advertisement.

The advertisement machine used to reproduce advertisements to the telephone subscriber between the time announcements is constructed similar to and operates in the same manner as the time announcement mechanism itself. The advertisements may be recorded on film in the same manner as the separate time announcements, there being a plurality of different advertisements, a plurality of sound tracks, a reproducer that could be shifted from one sound track to another, and a means for stopping the running of the film after each advertisement has been made. The advertisement record could consist of a loop of film having a single advertisement thereon which would be repeated between time announcements as shown in Fig. 1.

When the cam spring 125 operated exactly on the fifteenth second to place the tone on the line, it also closed ground to the left hand winding of relay 275. Relay 275 operates, locks up through its right hand winding to ground from contacts 189 of relay 198, and closes the 60 cycle power to the advertisement film driving motor 195. Motor 195 drives the advertisement film 187 past reproducer heads 188 and 189. The advertisement recorded on the film is picked up by the reproducer head 188, amplified by amplifier means 190, and induced over the line 192. Immediately after the advertisement, the control signal is picked up by reproducer head 199, amplified by amplifier means 196, rectified by rectifier means 197, and the D. C. current output operates relay 198. Relay 198 causes the ground to be removed from the lower winding of relay 275. Relay 275 restores and opens the 60 cycle power line to the advertisement film driving motor 195. Motor 195 ceases to drive the advertisement film. The momentum of the film carries the control signal past the head 199. The advertisement is reproduced in the first six seconds of every fifteen second period.

The above cycle of operation is repeated until the 480th time announcement has been made, that being "At the next tone signal the time will be 2 o'clock", and the film has stopped in response to the control signal recorded on the sound track. Those relays now operated at this time are relays 180, 270, and 290. At this point, cam 109 will have rotated to the position where its notch has caused the closing of cam spring 120, all other cam springs 116 to 121 inclusive being opened at this point. The one hour cam 111 is also rotated to the position where it will have caused the closing of cam springs 122. At exactly 2 o'clock, the notch on minute cam 112 causes the operation of cam springs 123 thereby closing ground through cam springs 123, 122 and 120 to the upper winding of relay 170. Relay 170 operates, prepares a circuit to its lower winding from ground at the now opened contacts 271 of relay 270 through contacts 171, closes a circuit from ground at cam springs 243 located on the periphery of cam 234 through contacts 172 to relay 250, closes a circuit from ground through contacts 173 to relays 255 and 260, and prepares a circuit to relay 258 from ground at contacts 291 of relay 290 through contacts 174. Relay 255 operates and removes the ground at contacts 256 from the lower winding of relay 180. Relay 180 restores and removes the ground at contacts 183 from relay 270. Relay 270 restores and closes the ground at contacts 271 through contacts 171 to the lower winding of relay 170. Relay 170 is thus held operated through its lower winding when the cam 112 causes the circuit to the upper winding of relay 170 to be opened at cam springs 123. Relay 260 operates and transfers lead 263 from one side of the power line, which at this time is opened at contacts 259, to the other side of the line at contacts 261 and lead 265 is transferred from said other side of the power line to said one side at contacts 262. Leads 263 to 266 inclusive from the film driving motor 212 are now connected to the power line 285 so that when the line is closed to the leads through contacts 259 the film driving motor 212 will run in a direction opposite to that followed during the period from 12 o'clock to 2 o'clock, the film 210 being taken off the lower reel 201 and taken up by the upper reel 200.

It will be remembered that at the start of the operation of this machine the reproducer head motor 241 had caused cams 230 to 235 inclusive to be rotated to such a position that cam 235 had caused cam springs 242 to be opened at which time motor 241 had ceased running. Operation of relay 170 closes the circuit from ground at cam springs 243 through contacts 172 to relay 250.

Relay 250 operates closing the circuit from the 60 cycle power line 285 to the motor 241 through contacts 251. Motor 241 is energized, rotating shaft 227 and thereby the cams 230 to 235 inclusive. The cams rotate until cam 234 causes cam springs 243 to open and remove the ground from relay 250. Relay 250 releases, opening the circuit to the motor 241 which is deenergized. Rotating with shaft 227, cam 220, by means of pins 221 to 226 inclusive, had moved the reproducer head 240 transverse to the film 210. The cam 234 is so positioned on the shaft 227 that when it operated cam springs 243 to stop the motor 241, the reproducer head 240 had been moved to the sound track on the film 210 which carries the time announcements from the first announcement "At the next tone signal the time will be 2 o'clock and 15 seconds" until the last time announcement "At the next tone signal the time will be 4 o'clock" in the second two hour period. Approximately six seconds after 2 o'clock, cam 113 causes cam springs 124 to be closed thereby closing the circuit from ground at contacts 291 of relay 290 through contacts 257 of relay 255 to the lower winding of relay 280. Relay 280 operates and closes a holding circuit from ground at contacts 297 of relay 296 through contacts 281 to its upper winding so that relay 280 will be held operated when the circuit is opened to its lower winding at cam springs 124. Relay 280 on operating closes ground at contacts 291 of relay 290 through contacts 282 and contacts 174 to relay 258. Relay 258 operates and closes the circuit from the 60 cycle power line 285 over leads 263 to 266 inclusive to the film driving motor 212. Film driving motor 212 rotates in the direction to cause the capstan 209 to drive the film 210 from the lower reel 201 to the upper reel 200. The reproducer head 240 picks up the first time announcement on the sound track and the announcement is amplified through amplifying means 190 and induced over line 192 to be heard by any subscriber that may be on the line at the time. Immediately after the time announcement, reproducer head 211 picks up the signal on the control sound track which is then amplified by amplifying means 277 and rectified by rectifying means 289, the D. C. output operating relay 296. Relay 296 removes the ground at contacts 297 from the upper winding of relay 280. Relay 280 restores and opens the circuit from ground at contacts 291 to relay 258. Relay 258 restores, opening a circuit from the power line to the film driving motor 212. Film driving motor 212 stops, in turn stopping the film 210. Exactly on the fifteenth second, cam 114 closes cam springs 125 thereby closing ground to the oscillating circuit 191 for placing a tone signal on the line and also closes the upper winding of relay 275 which operates as previously described to reproduce an advertisement between the time announcements.

At approximately the sixth second of the second fifteen second period, cam 113 closes the circuit through cam springs 124 to the lower winding of relay 280. Relay 280 operates and subsequent operations of the circuit are similar to those described previously, the time announcements being successively made after which the film driving motor stops in response to signals on the control sound track, the advertisement being made between the time announcements. This continues during the entire second two hour period, the last announcement in the second announcement sound track being "At the next tone signal the time will be 4 o'clock." Shortly before 4 o'clock, cam 108 will have closed cam springs 119, all other cam springs 116 to 121 being open a this time, and cam 111 will have closed cam springs 122. At exactly 4 o'clock, cam 112 closes cam springs 123 thereby closing ground at contacts 291 through cam springs 123, 122 and 119 to the upper winding of relay 160. Relay 160 operates, preparing a circuit from ground at the now open contacts 256 of relay 255 to the lower winding of relay 160, closes ground at contacts 163 to relay 270, and prepares a circuit from ground at contacts 291 through contacts 164 to relay 258. Relay 270 operates, opening the circuit to the lower winding of relay 170 at contacts 271, and prepares a circuit to the lower winding of relay 280 through contacts 272. Relay 170 restores opening the circuit at contacts 173 to relays 255 and 260. Relay 255 restores, closing ground at contacts 256 to the lower winding of relay 160 to hold relay 160 operated when the circuit to its upper winding is open at cam springs 123. Relay 260 restores, transferring the leads leading to the film driving motor 212 from one side of the 60 cycle power line to the other side so that when the circuit is closed from the power line to the motor 212, on operation of relay 258, the motor 212 will again drive the film in a direction from the upper relay 200 to the lower relay 201.

The circuit functions in a manner similar to that described previously, the motor 241 being energized to cause cam 220 to associate the reproducer head 240 with the announcement sound track carrying the time announcements for the third two hour period and cam 233 causing the motor 241 to be deenergized when the reproducer head 240 has been associated with the proper announcement sound track. The time announcements in the third two hour period are reproduced in the same manner as for the previous two two hour periods, the film 210 starting under control of the timer and stopping under control of a signal recorded in the sound track once each 15 second period, and an advertisement being reproduced between time announcements. At the end of the third two hour period the film driving motor connections are again reversed and the reproducer head 240 associated with the announcement sound track containing the time announcements for the fourth two hour period.

The time announcements in the fourth two hour period are reproduced after which the film driving motor is again reversed and the reproducer head 240 associated with the fifth announcement sound track so that the time announcements in the fifth two hour period will be reproduced. Subsequently, the announcements in the sixth two hour period are reproduced, the last announcement being "At the next tone signal the time will be twelve o'clock." After this last announcement, the reproducer head 240 is again associated with the first announcement sound track and the complete twelve hour announcement period is repeated. Announcements will continue to be made until the machine is manually released, the release circuit not being shown.

The fifteen second cam 115 is employed to keep the line 192, on which one or more telephone subscribers may be connected, clear of disagreeable clicks. Such disagreeable clicks are produced by the operation of relays and the starting and stopping of the various motors used in the machine, these noises being picked up and amplified by the amplifier means 190 shown in Fig. 1. The cam 115 is designed to open the secondary winding of transformer 193 in the line 192 during the short intervals of time during every fifteen second period when there are relays operating or motors stopping and starting. The cam 115 is so designed that it opens cam springs 126 during the first one half second of every fifteen second period so that no disagreeable clicks will be heard when relays 130, 140, 150, 160, 170, 180, 250, 255, 260, etc., may be first operated and motor 241 first started. After the first half second the cam 115 will cause cam springs 126 to be closed thereby closing the secondary winding of transformer 193 so that the advertisement may be heard by the telephone subscriber. During the period from about the fifth and one half second to the sixth and one half second of every fifteen second period, cam 115 opens cam springs 126 thereby opening the secondary winding of transformer 193 during the period when disagreeable clicks may be caused by the operation of relays 280, 258 and the starting of film driving motor 212. The secondary winding is again held open by the cam 115 for about the last one and one half second of every fifteen second period to prevent disagreeable clicks from reaching the subscriber when relays 296, 280, 258, etc., may be operating and/or releasing.

It should be understood that the control signal is not the only means of stopping the film driving motor after each time announcement. A system may be employed as shown in Figs. 7, 8 and 9. In place of control signals recorded in a sound track of film 210, holes 900 are cut in the film at the proper intervals. In place of rollers 204 and 205 and reproducer head 211, rollers 700 and 702 and spring contacts 800 are employed. The roller 700 contains a groove 701 into which roller 702 will fit. The film 210 is passed between the rollers 700 and 702, the holes 900 being positioned to allow roller 702 to drop into the groove 701, thereby closing spring contacts 800. Contacts 800 close ground to relay 296 to cause the film driving motor to stop. The momentum of the film will carry the hole past the roller 702 before the film completely stops.

It should also be understood that a film with a plurality of sound tracks thereon is not the sole means of carrying this invention into practice. A plurality of records may be employed, the records running simultaneously and synchronously, all being driven by a common driving means. For instance, a plurality of wire recordings could be employed one being a wire having the control signals recorded thereon and the others being announcement wires. The wires would run simultaneously at the same speed past reproducers and the control signals so placed that they are picked up immediately after the announcements.

Numerous uses and adaptations of this invention will occur to those versed in the art and all changes and modifications coming within the scope of the appended claims are embraced thereby.

What is claimed is:

1. In an announcing system, a film, a plurality of parallel spaced sound tracks running longitudinally on said film comprising a control sound track and a plurality of announcement sound tracks, a plurality of control signals recorded in said control sound track, a plurality of separate announcements recorded in each announcement sound track in such manner that the announcement sound tracks run in alternately opposite directions, reproducing means associated with the control sound track for reproducing the control signals, a second reproducing means associated with one of said announcement sound tracks for reproducing the announcements recorded therein, reversable driving means for moving the film past said first and second reproducer means and in the direction to reproduce the announcements in said one announcement sound track, a timer device, means operated under control of said timer device for automatically and intermittently starting said driving means at predetermined times, means operated in response to the reproduction of said control signals for stopping said driving means intermittently, a second means operated under control of said timer device for moving said first reproducing means from said one announcement sound track to another announcement sound track, and a third means operated under control of said timer device for reversing the driving means to cause the film to run in the direction opposite to that direction for reproducing the announcements on said one announcement sound track.

2. In a time announcing system, a record medium, a series of sound tracks on said record medium each having time announcements recorded thereon in accordance with time-of-day periods, a reproducer, driving means for causing relative movement between the record medium and the reproducer, a timer device comprising a first series of cams each corresponding to one of said time-of-day periods, means for shifting said reproducer from one sound track to the next, said means operated under control of said series of cams, a second series of cams means for producing a tone signal, operated by said timer at shorter intervals of time, said second series of cams causing the starting of said driving means at predetermined shorter periods and the operation of said tone signal means at predetermined shorter periods.

3. In a time announcing system, a record medium havin a plurality of sound tracks thereon running parallel to and not connected with each other and each having announcements recorded thereon corresponding to a period of time, a reproducer associated with said record medium for reproducing said time announcements, a motor having a series of cams, a device operated by said motor for shifting the reproducer from one sound track to the next, a timer for starting said motor at certain predetermined times of the day to thereby cause said device to shift the reproducer, and means controlled by said cams when the reproducer has reached the proper sound track for stopping said motor to thereby stop said reproducer on said proper sound track.

4. In a time announcing system, a film, a plurality of parallel sound tracks running longitudinally on said film, a plurality of separate time announcements recorded in each sound track, each time announcement corresponding to a period of time, a reproducer associated with one sound track at a time, means for causing relative movement between the film and the reproducer to thereby reproduce the time announcements, a timing device for automatically operating said means in accordance with time, and means controlled by said timing device for automatically moving said reproducer from one sound track to another at predetermined periods of time of greater length than said first periods of time.

5. In an announcing system, a film, a plurality of parallel spaced sound tracks extending longitudinally on said film comprising a control sound track and a plurality of announcement sound tracks, reproducing means associated with one of the announcement sound tracks for reproducing the sound recorded thereon, a second reproducing means for reproducing the sound recorded on the control sound track, driving means for moving the film relative to the reproducing means, a timer device, means operated under control of the timer device for automatically and intermittently energizing said driving means at certain predetermined times of the day, means operated in response to spaced sounds on said control sound track reproduced by the second reproducing means for deenergizing said driving means intermittently, and a second means operated under control of said timer device for moving said first reproducing means transversely from said one announcement sound track to another announcement sound track at certain other predetermined times of the day.

6. In a time announcing system, a record device, a plurality of sound tracks on said record device running in alternately opposite directions each corresponding to a certain time-of-day period, a plurality of time announcements recorded in each sound track each corresponding to a shorter time-of-day period within said first time-of-day period, a reproducer associated with one of said sound tracks, reversible driving means for causing relative movement between the record device and reproducer to thereby reproduce the announcements recorded in said one sound track, a timer device for indicating the time of the day, means controlled by said timer device for energizing said driving means once during each said shorter time-of-day periods, means for automatically deenergizing said driving means during said shorter time-of-day periods, a second means controlled by said timer device for moving said reproducer from said one sound track to another during each said first time-of-day period, and a third means controlled by said timer device for reversing said driving means during each said first time-of-day period.

7. In a time announcing system, a record, a plurality of sound tracks on said record running in alternately opposite directions and each corresponding to a certain two hour period, a plurality of time announcements in each of said sound tracks each corresponding to a fifteen second period within a two hour period, a reproducer associated with one of said sound tracks for reproducing the time announcements within that two hour period, reversible driving means for moving the record past the reproducer to thereby reproduce the time announcements, a timer device for indicating the time of the day, a series of cams controlled by said timer device, each cam corresponding to one of said two hour periods, means controlled by said timer device for energizing said driving means once every said fifteen second period, means for automatically deenergizing said driving means once every said fifteen second period, and means controlled by said series of cams for moving said reproducer from said one sound track to another and for reversing said driving means once every said two hour period.

8. In a time announcing system, a film, a plurality of sound tracks on said film including a control sound track and a plurality of announcement sound tracks, a plurality of control signals recorded in said control sound track, a plurality of time announcements recorded in said announcement sound tracks in such manner that the announcement sound tracks run in alternately opposite directions, a reproducer associated with the control sound track, a second reproducer associated with one of said announcement sound tracks, reversible driving means for moving the film past the reproducers to thereby reproduce the announcements and the control signals, a timer device comprising a synchronous motor, cam means controlled by said motor for energizing said driving means at predetermined times to cause reproduction of said time announcements and said control signals, means controlled by the reproduction of said control signals for deenergizing said driving means after each time announcement, a second cam means controlled by said motor for producing a tone signal after each time announcement, and a third cam means controlled by said motor for moving said second reproducer from said one announcement sound track to the next and for reversing the driving direction of said driving means at predetermined times.

9. In combination with the time announcing system of claim 8, a second film, a second control sound track on said second film, an advertisement sound track on said second film, control signals recorded in said second control sound track, advertisements recorded in said advertisement sound track, a third reproducer associated with said second control sound track, a fourth reproducer associated with said advertisement sound track, a second driving means for causing relative movement between said third and fourth reproducers and the second film to reproduce said control signals and said advertisements, means controlled by said second cam means for energizing said second driving means after each tone signal, and means controlled by the reproducing of the control signals on said second control sound track for deenergizing said second driving means.

10. In a sound reproducing system, a film, a plurality of parallel sound tracks on said film comprising a plurality of announcement sound tracks and a control sound track common to said announcement sound tracks, a plurality of control signals recorded in said control sound track, a plurality of separate announcements recorded in each announcement sound track, reproducing means associated with said film for reproducing said announcements and control signals, the announcements being reproduced in succession from each sound track, the announcement sound tracks being reproduced in succession, driving means for causing relative movement between said film and said reproducing means to cause reproduction of said announcements and control signals, a timer device operated to automatically start said driving means at predetermined times, and means operated in response to the reproduction of said control signals for stopping said driving means after the reproduction of each announcement on each announcement sound track.

11. In a sound reproducing system, a film, a plurality of parallel sound tracks running longitudinally on said film comprising a plurality of announcement sound tracks and a control sound track common to said announcement sound tracks, a plurality of control signals recorded in said control sound track, a plurality of separate announcements recorded in each announcement sound track in such manner that the announcement sound tracks run in alternately opposite directions, reproducing means associated with the control sound track for reproducing the control signals, a second reproducing means associated with said announcement tracks and operable to reproduce the announcement in each announcement sound track, the announcement tracks being reproduced in successive order, reversible driving means for causing said film to move past said reproducing means first in one direction and then in the other direction to cause said control signals to be reproduced during movement in each direction and for causing the separate announcements to be reproduced from first one announcement sound track and then an adjacent announcement sound track, a timing device for automatically starting said driving means at certain predetermined times of the day to cause reproduction of an announcement in any one of said announcement sound tracks and one of said control signals, and means responsive to the reproduction of the control signal for stopping said driving means after said announcement has been reproduced.

12. In a sound reproducing system, a plurality of announcement record devices each having recorded thereon a different series of short time-of-day announcements within a certain longer time-of-day period, reproducing means for reproducing the time-of-day announcements on one announcement record device at a time, the announcement record devices being reproduced in succession, a control record device common to said plurality of record devices having recorded thereon a plurality of signals, each signal associated with one of said short time-of-day announcements on each of said announcement record devices, reproducing means for reproducing the signals on the control record device, the same signals being reproduced during the reproduction of each different announcement record device, driving means for causing relative movement between said record devices and said reproducing means to cause reproduction of said announcements and said control signals, a timer device for energizing said driving means once during each said short time-of-day period to cause reproduction of a time-of-day announcement on one of said record devices and the common associated control signal, and means responsive to the reproduction of the control signal associated with the certain time-of-day announcement reproduced for automatically deenergizing said driving means.

13. In a time announcing system, a film, a pair of parallel sound tracks running longitudinally on said film comprising a time announcement sound track and a control sound track, a plurality of time announcements recorded in said announcement sound track, a plurality of control signals recorded in said control sound track, reproducing means associated with the film for reproducing the time announcements and control signals, driving means for causing relative movement between the film and the reproducing means, a second film, a pair of parallel sound tracks on said second film comprising a second control sound track and a second announcement sound track, a plurality of announcements in said second announcement sound track, a plurality of control signals recorded in said second control sound track, a second reproducing means associated with the second film for reproducing the announcements and the control signals, a second driving means for causing relative movement between the second film and the second reproducing means, a timer device, means controlled by said timer device for automatically and intermittently energizing said first driving means at predetermined times, means operated in response to the reproduction of the control signals on the first control sound track for intermittently deenergizing said first driving means, a second means controlled by said timer device for automatically and intermittently energizing said second driving means after the intermittent deenergization of said first driving means, and means operated in response to the reproduction of the control signals on said second control sound track for deenergizing said second driving means.

14. In a time announcing system, means operable to reproduce a plurality of time-of-day announcements, a second means operable to reproduce a plurality of other announcements, a timer device operated at certain predetermined times of the day to cause said first means to start in operation, control means automatically operated after the reproduction of each of said time announcements to stop said first means, a second timer device operated after the stopping of said first means and at certain predetermined times of the day to cause said second means to start in operation, and a second control means operated after the reproduction of each of said other announcements to stop said second means.

15. In a time announcing system of the class wherein the time announcements are recorded on a record device in such a manner that the time announcement sound tracks run in alternately opposite directions on the record device and wherein a reproducer is associated with one sound track at a time and is shiftable from one track to another and wherein a reversible driving means is employed to cause relative movement between the record device and the reproducer in either of two different directions to cause reproduction of the announcements on any of the sound tracks, the improvement comprising a clock device for keeping the time of the day, first means operated under control of said clock device for starting said driving means at certain predetermined times of the day, means for automatically stopping said driving means after a time announcement has been reproduced, a second means operated under control of said clock device for shifting the reproducer from one sound track to another at certain other predetermined times of the day, and a third means operated under control of said timer device for reversing said driving means at certain other predetermined times of the day.

EDWARD S. PETERSON.

REFERENCES CITED

The following references are of record in the file of this patent:

UNITED STATES PATENTS

| Number | Name | Date |
|---|---|---|
| 2,004,248 | Miller | June 11, 1935 |
| 2,252,327 | Lovett | Aug. 12, 1941 |
| 2,275,961 | Heller | Mar. 10, 1942 |
| 2,344,541 | Ferris | Mar. 21, 1944 |
| 2,444,818 | Franklin | July 6, 1948 |

Certificate of Correction

Patent No. 2,530,076 November 14, 1950

EDWARD S. PETERSON

It is hereby certified that error appears in the printed specification of the above numbered patent requiring correction as follows:

Column 16, lines 1 and 2, strike out "means for producing a tone signal," and insert the same in line 1, after the word and comma "cams,"; line 9, for "havin" read *having*;

and that the said Letters Patent should be read as corrected above, so that the same may conform to the record of the case in the Patent Office.

Signed and sealed this 1st day of May, A. D. 1951.

[SEAL]

THOMAS F. MURPHY,
*Assistant Commissioner of Patents.*